(12) United States Patent
Imura et al.

(10) Patent No.: US 10,266,114 B2
(45) Date of Patent: Apr. 23, 2019

(54) IMAGE GENERATING DEVICE AND IMAGE GENERATING METHOD

(71) Applicant: DENSO CORPORATION, Kariya, Aichi-pref. (JP)

(72) Inventors: Shingo Imura, Kariya (JP); Hirohiko Yanagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/534,435

(22) PCT Filed: Oct. 29, 2015

(86) PCT No.: PCT/JP2015/080506
§ 371 (c)(1),
(2) Date: Jun. 8, 2017

(87) PCT Pub. No.: WO2016/092967
PCT Pub. Date: Jun. 16, 2016

(65) Prior Publication Data
US 2017/0368993 A1 Dec. 28, 2017

(30) Foreign Application Priority Data
Dec. 9, 2014 (JP) .................................. 2014-249105

(51) Int. Cl.
*H04N 7/18* (2006.01)
*B60R 1/00* (2006.01)
(Continued)

(52) U.S. Cl.
CPC .................. *B60R 1/00* (2013.01); *G06T 1/00* (2013.01); *G06T 3/40* (2013.01); *G06T 7/70* (2017.01);
(Continued)

(58) Field of Classification Search
CPC .... B60R 1/00; G06T 7/70; G06T 3/40; H04N 7/18
(Continued)

(56) References Cited

U.S. PATENT DOCUMENTS

2008/0007428 A1 1/2008 Watanabe et al.
2009/0010567 A1 1/2009 Akiba et al.
(Continued)

FOREIGN PATENT DOCUMENTS

JP H06-227318 A 8/1994
JP 2002-225628 A 8/2002
(Continued)

OTHER PUBLICATIONS

JP2002-225628 Machine Translation.*
JP2007-288586 Machine Translation.*

*Primary Examiner* — Nguyen T Truong
(74) *Attorney, Agent, or Firm* — Knobbe, Martens, Olson & Bear, LLP

(57) ABSTRACT

An ECU captures an image of an imaging region around an own vehicle, and acquires image data, the imaging region being configured by a plurality of imaging areas. The ECU determines whether the object is present in the imaging areas, on the basis of detection results of an object present around the own vehicle. The ECU selects a target area to be displayed in an easy-to-see state from among the plurality of imaging areas, on the basis of determination results. The ECU reduces and corrects the image data of each imaging area such that an image of the target area is displayed in the easy-to-see state compared to an image of each imaging area to generate display image data.

8 Claims, 5 Drawing Sheets

(51) Int. Cl.
  *G06T 1/00*   (2006.01)
  *G08G 1/16*   (2006.01)
  *G06T 7/70*   (2017.01)
  *G06T 3/40*   (2006.01)

(52) U.S. Cl.
  CPC ............... *G08G 1/16* (2013.01); *H04N 7/18* (2013.01); *B60R 2300/301* (2013.01); *B60R 2300/306* (2013.01); *B60R 2300/8033* (2013.01); *G06T 2207/10016* (2013.01); *G06T 2207/30261* (2013.01)

(58) Field of Classification Search
  USPC .......................................................... 347/148
  See application file for complete search history.

(56) References Cited

U.S. PATENT DOCUMENTS

| | | |
|---|---|---|
| 2010/0103264 A1 | 4/2010 | Nagao |
| 2011/0050886 A1 | 3/2011 | Thompson et al. |
| 2013/0222593 A1 | 8/2013 | Byrne et al. |
| 2014/0225723 A1 | 8/2014 | Sobue et al. |
| 2014/0285666 A1* | 9/2014 | O'Connell ............... B60R 1/00 348/148 |
| 2015/0022665 A1 | 1/2015 | Lu |
| 2017/0200197 A1* | 7/2017 | Brubaker .................. G09F 9/35 |

FOREIGN PATENT DOCUMENTS

| | | |
|---|---|---|
| JP | 2004-142557 | 5/2004 |
| JP | 2007-288586 A | 11/2007 |
| JP | 2010-109483 A | 5/2010 |
| JP | 2010-116086 | 5/2010 |

* cited by examiner

IMAGE GENERATING DEVICE AND IMAGE GENERATING METHOD

CROSS-REFERENCE TO RELATED APPLICATION

This application is based on and claims the benefit of priority from earlier Japanese Patent Application No. 2014-249105 filed on Dec. 9, 2014 the description of which is incorporated herein by reference.

TECHNICAL FIELD

The present disclosure relates to an image generating technique.

BACKGROUND ART

Conventionally known methods include adding a predetermined correction to distorted images captured around the own vehicle by a wide-angle camera, generating three undistorted images captured in the forward, leftward, and rightward directions of the wide-angle camera, and displaying the undistorted images, juxtaposed, on a screen (PTL 1).

CITATION LIST

Patent Literature

[PTL 1] JP 2010-109483 A

SUMMARY OF THE INVENTION

Technical Problem

However, the driver's line of sight during driving is usually in the forward direction of the own vehicle. Accordingly, if the images around the own vehicle are merely displayed in an undistorted state, there is a probability that the driver cannot recognize an object present around the own vehicle.

The present disclosure has an object of enabling a driver to easily recognize an object present around the own vehicle.

Solution to Problem

An image generating device of the present disclosure includes an acquisition means, a determination means, a selection means, a generation means, and a display means. The acquisition means captures an image of an imaging region around an own vehicle with a camera through a wide-angle lens, and acquires image data, the imaging region being configured by a plurality of imaging areas. The determination means detects an object present around the own vehicle and determines whether the object is present in the imaging areas, on the basis of detection results. The selection means selects a target area to be displayed in an easy-to-see state from among the plurality of imaging areas, on the basis of determination results derived from the determination means. The generation means adjusts a reduction degree of an image of each imaging area such that the image of the target area is displayed in an easy-to-see state compared to the image of each imaging area, and corrects the image data to generate display image data for displaying the entire imaging region. The display means displays the display image data.

With this configuration, the image generating device of the present disclosure displays an image offering a broad view around the own vehicle and displays, on the image thus displayed, an imaging area where the object is present in an easy-to-see state (high-visibility state). Therefore, the driver can easily recognize the object present around the own vehicle.

The description set forth in the present section is for showing correspondency to the specific means described in the embodiments set forth below, and should not be construed as limiting the technical scope of the present disclosure.

DESCRIPTION OF EMBODIMENTS

With reference to the drawings, some embodiments of the present disclosure will hereinafter be described.

[First Embodiment]
[Configuration]

Figure 1:
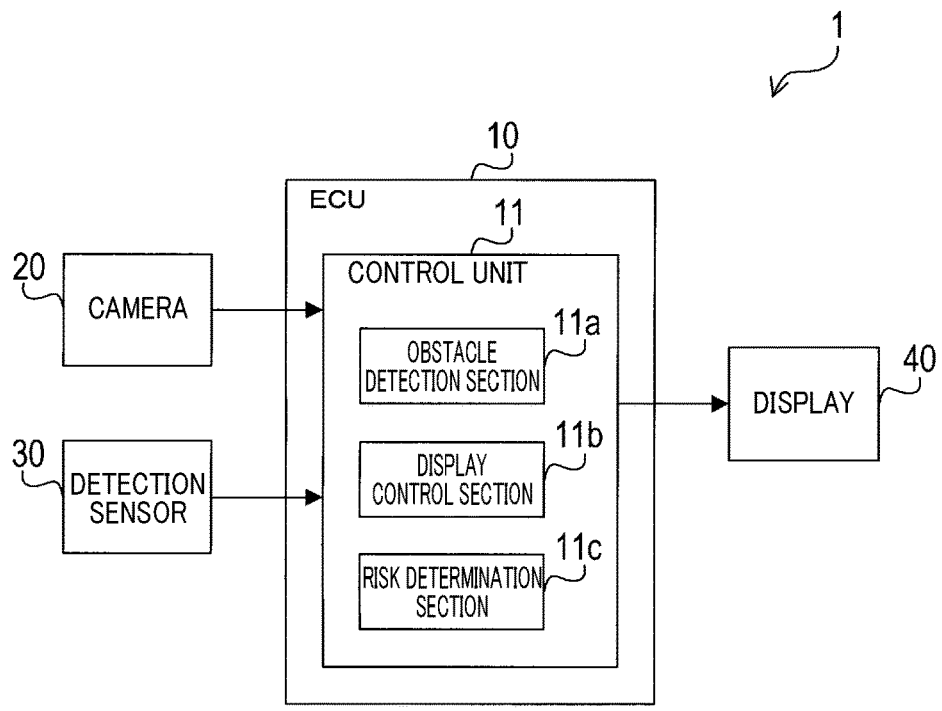
FIG. 1 is a block diagram illustrating a configuration of an imaging system, according to a first embodiment.

FIG. 1 is a block diagram illustrating a configuration of an imaging system according to the present embodiment. An imaging system 1 according to the present embodiment is mounted to a vehicle to display an image ahead of the own vehicle on a display, and includes an ECU 10, a camera 20, a detection sensor 30, a display 40, and the like.

Figure 2:
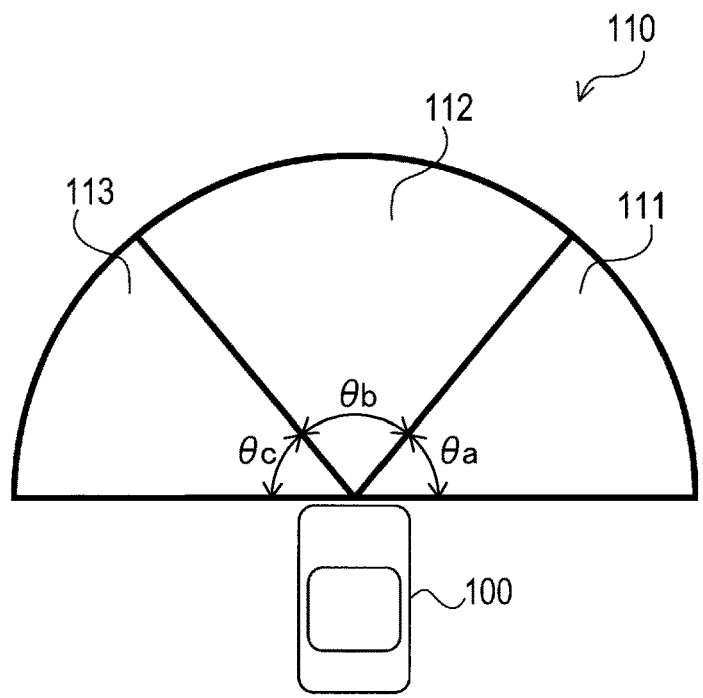
FIG. 2 is a diagram illustrating an imaging region and imaging areas, according to the first embodiment.

FIG. 2 is a diagram illustrating an imaging region and imaging areas of the present embodiment. The camera 20 captures an image of an imaging region 110 provided in the forward direction of an own vehicle 100 through a wide-angle lens, and outputs a video signal indicating the image to the ECU 10. The imaging region 110 according to the present embodiment is made up of three imaging areas (a plurality of imaging areas), namely, a first imaging area 111, a second imaging area 112, and a third imaging area 113.

Referring to FIG. 1 again, the detection sensor 30 detects an object (e.g., a moving object such as a pedestrian or a vehicle, an obstacle on the road, a guardrail set up along the road, a traffic light, a utility pole, or the like) that is present in the imaging region 110 in the forward direction of the own vehicle 100. The detection sensor 30 includes a radar, a sonar, or the like, for example, and transmits a search wave and detects a reflected wave of the search wave to thereby detect a location, size, type, and the like of the object present ahead of the own vehicle 100. The detection sensor 30 then outputs a detection signal indicating detection results to the ECU 10.

Besides this, the detection sensor 30 may also include a stereo camera or the like, for example. The detection sensor 30 may also include the camera 20, and may analyze the image captured by the camera 20 to detect the object ahead of the own vehicle 100.

The ECU 10 corresponds to the image generating device of the present embodiment, and includes a control unit 11 made up of a CPU, ROM, RAM, I/O, and the like. The CPU of the control unit 11 executes a program stored in the ROM to perform overall control of the ECU 10 and perform various processes. The CPU of the control unit 11 operates according to the program to serve as an obstacle detection section 11a, a display control section 11b, and a risk determination section 11c.

Based on a detection signal from the detection sensor 30, the obstacle detection section 11a detects a location, size, type, and the like of an object present ahead of the own vehicle 100.

Based on a video signal from the camera 20, the display control section 11b generates image data. The display control section 11b corrects the generated image data, and generates display image data for displaying the entire imaging region 110. The display control section 11b outputs a video signal for displaying the generated display image data to the display 40. The display 40 is a device made up of a liquid crystal display, an organic EL display, and the like, and displays an image on the basis of the video signal derived from the ECU 10.

Based on the detection results from the detection sensor 30, the risk determination section 11c determines a degree of risk that indicates a probability for an object present ahead of the own vehicle 100 to contact (i.e., collide against) the own vehicle 100.

[Operation]

An operation of the imaging system 1 will be described. In the following description, the right side and the left side relative to the traveling direction of the own vehicle 100 (hereinafter referred to as forward direction of the camera 20) are simply referred to as right and left, respectively.

As shown in FIG. 2, the imaging region 110 spread in the forward direction of the own vehicle 100 is in a sector shape having a center angle of 180° in plan view. In other words, the imaging region 110 is horizontally fanned out in the forward direction of the own vehicle 100. The imaging region 110 is made up of the three imaging areas, namely, the first, second, and third imaging areas 111, 112 and 113, each being formed into a sector shape. In other words, the first, second and third imaging areas 111, 112 and 113 are arranged in a row in a horizontal direction intersecting the forward direction of the camera 20. The center angle is not limited to 180°. The first imaging area 111 (right border area) positioned at the right end of the imaging region 110 has a center angle θa, and the third imaging area 113 (left border area) positioned at the left end of the imaging region 110 has a center angle θc, the center angle θa being equal to the center angle θc (θa=θc).

Based on the image data acquired from the camera 20, the ECU 10 displays an image of the imaging region 110 on the display 40. The display image displayed on the display 40 is divided into three image segments (i.e., right image segment, center image segment, and left image segment) arranged in the right-and-left direction. The image in the first imaging area (right border area) 111 is displayed in the right image segment. The image in the second imaging area (center area) 112 is displayed in the center image segment. The image in the third imaging area (left border area) 113 is displayed in the left image segment.

The camera 20 captures an image of the imaging region 110 through a wide-angle lens. Accordingly, the image directly generated from the video signal of the camera 20 is distorted in the right and left side portions. In this regard, the ECU (image generating device) 10 of the present embodiment corrects the image data to generate display image data, and using the generated display image data as a basis, displays the image of the imaging region 110 on the display 40. In this case, the correction made by the ECU 10 is in conformity with the object detection results derived from the detection sensor 30.

Figure 3:
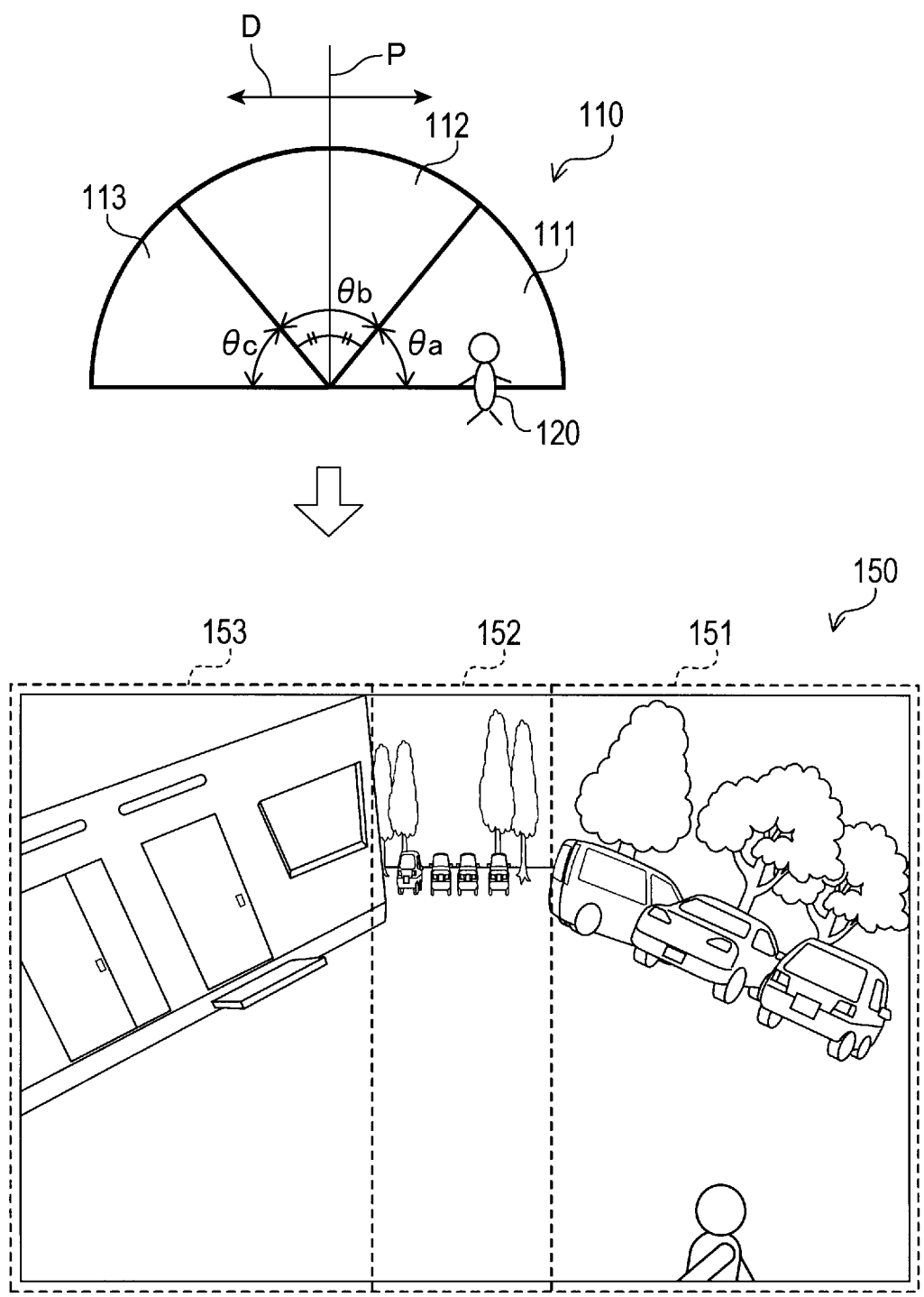
FIG. 3 is a diagram illustrating a first display image (normal image), according to the first embodiment.

FIG. 3 shows a diagram illustrating a first display image (normal image) of the present embodiment. FIG. 3 shows an example of a pedestrian as an example of an object 120 detected by the detection sensor 30. In the following description, for the sake of clarifying a positional relation between the imaging areas, the first imaging area 111 is referred to as a right border area 111, the second imaging area 112 is referred to as a center area 112, and the third imaging area 113 is referred to as a left border area 113. The driver during driving has a difficulty in directly seeing the right and left border areas 111 and 113 compared to seeing the center area 112. If the object 120 is not present in the center area 112, the ECU 10 displays, on the display 40, a first display image (hereinafter referred to as normal image) 150 in which the right and left border areas 111 and 113 have higher visibility than the center area 112. In other words, if the object 120 is not present in the center area 112, the ECU 10 allows the display 40 to display the images of the right and left border areas 111 and 113 in a display format easily visible to the driver (i.e., in an easy-to-see state).

In a center image region 152 of a normal image 150, the image of the center area 112 is displayed being reduced (hereinafter referred to as reduced state) relative to the images of the right and left border areas 111 and 113. FIG. 3 shows a display example in which an image has been corrected and reduced at a predetermined reduction ratio in a horizontal direction D orthogonal to a straight line P (center line) which evenly divides the center angle θb of the center area 112 into two (i.e., reduced in the right-and-left direction relative to the forward direction of the camera 20).

On the other hand, in a right image region 151 and a left image region 153 of the normal image 150, the images of the right and left border areas 111 and 113 are displayed not being reduced (non-reduced state), or being reduced at a reduction ratio lower than that applied to the center area 112. FIG. 3 shows a display example in which images are not reduced (corrected) (i.e., in a state close to the vision obtained through the driver's direct visual recognition), to achieve higher visibility (i.e., to achieve easier visual recognition) for the driver than the display image of the center area 112 displayed in a reduced state. In other words, the display example shows a state in which images are corrected and reduced at a reduction ratio lower than that of the reduced state of the center area 112. Specifically, in the example shown in FIG. 3, the images of the right and left border areas 111 and 113 are displayed being enlarged relative to the image of the center area 112 where the object 120 is not present (i.e., displayed being relatively enlarged). In this way, in the present embodiment, the reduction degrees of the respective images of the imaging areas are adjusted such that the image of the imaging area where the object 120 is present is displayed in a more easy-to-see state than the images of other imaging areas, thereby correcting the image data. Thus, in the present embodiment, the display image data for entirely displaying the imaging region 110 is generated. In the following description, the displayed state achieving high visibility to the driver is referred to as normal state, for the sake of convenience.

Figure 4:
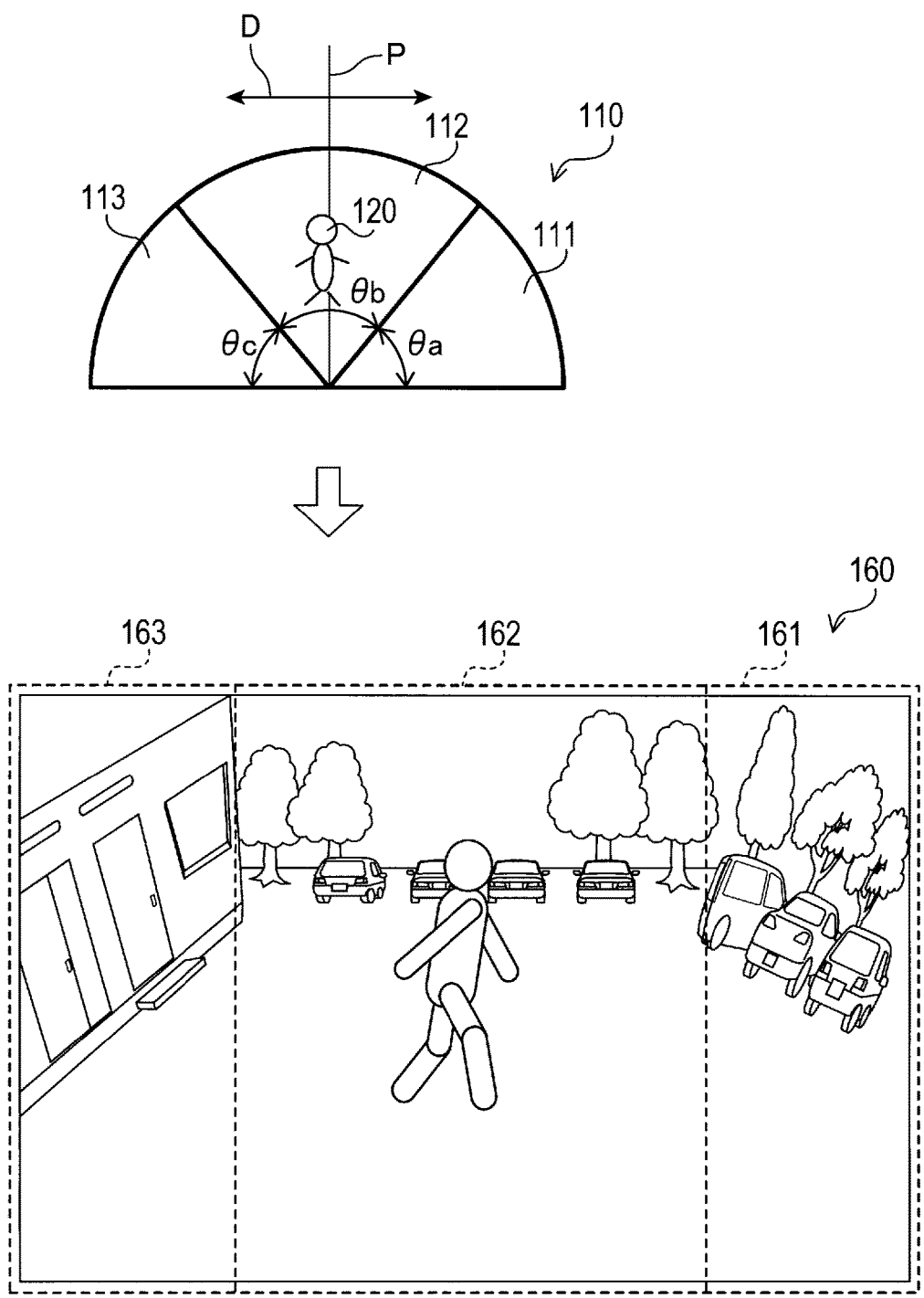
FIG. 4 is a diagram illustrating a second display image (warning image), according the first embodiment.

In contrast, if the object 120 is present in the center area 112, the ECU 10 displays, on the display 40, a second display image in which the center area 112 achieves higher visibility than the right and left border areas 111 and 113 (hereinafter referred to as warning image). FIG. 4 shows a display example of when the object 120 is present in the center area 112.

As shown in FIG. 4, the image of the center area 112 where the object 120 is present is displayed in a normal state in a center image region 162 of a warning image (second display image) 160. On the other hand, in a right image region 161 and a left image region 163, the images of the right and left border areas 111 and 113, respectively, are displayed in a reduced state.

Figure 5:
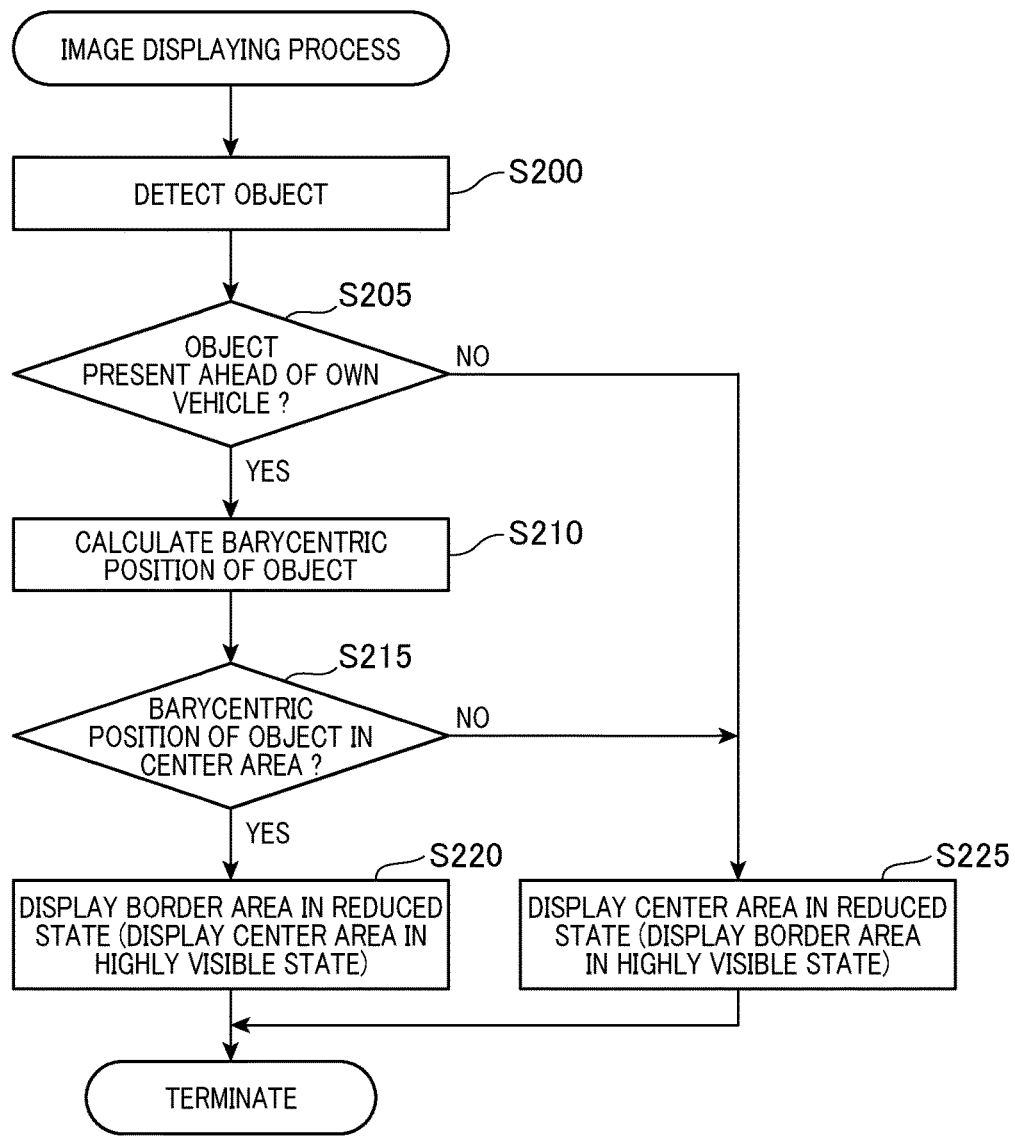
FIG. 5 is a flowchart illustrating an image displaying process, according to the first embodiment.

Referring to a flowchart of FIG. 5, hereinafter will be described an image displaying process in which the ECU (image generating device) 10 of the present embodiment generates an image of the imaging region 110 on the basis of a video signal derived from the camera 20, and displays the image on the display 40. The present process is cyclically performed by the CPU of the control unit 11 provided to the ECU 10.

Based on the detection signal from the detection sensor 30, the CPU of the control unit 11 detects the location, size, type and the like of the object 120 present ahead of the own vehicle 100 (S200), and allows the process to proceed to S205. In this way, the CPU of the control unit 11 serves as the obstacle detection section 11a by performing the process of S200. Then, the CPU determines whether the object 120 is present ahead of the own vehicle 100 (S205). As a result, if the CPU determines that the object 120 is present ahead of the own vehicle 100 (YES at S205), the CPU allows the process to proceed to S210. On the other hand, if the CPU determines that the object 120 is not present ahead of the own vehicle 100 (NO at S205), the CPU allows the process to proceed to S225.

If the CPU determines that the object 120 is present ahead of the own vehicle 100, the CPU calculates the barycentric position of the detected object 120 (S210), and allows the process to proceed to S215. In this case, the CPU may calculate the barycentric position of the object 120 by the following method, for example. Specifically, a region where the detected object 120 is present (hereinafter referred to as object region) is identified on the horizontal plane where the own vehicle 100 is present, and the center of the identified region is taken to be the barycentric position.

Then, the CPU determines whether the calculated barycentric position is in the center area 112 of the imaging region 110 (S215). Thus, if the CPU determines that the barycentric position is in the center area 112 (YES at S215), the CPU allows the process to proceed to S220 and displays the warning image 160 on the display 40. In this case, the CPU determines the center area 112 of the imaging region 110, where the object 120 is present, to be a target area which is to be displayed in an easy-to-see state. Thus, the CPU corrects the image data such that the images of the right and left border areas 111 and 113 of the imaging region 110 are displayed in a reduced state, while the image of the center area 112 where the object 120 is present is displayed in a normal state, and generates the display image data for entirely displaying the imaging region 110 (S220). Thus, the image of the center area 112 is displayed being enlarged compared to the images of the right and left border areas 111 and 113. In other words, the CPU displays the image of the center area 112 where the object 120 is present in a relatively enlarged manner, and displays the detected object 120 in an easily-visible display format (i.e., in an easy-to-see state). On the other hand, if the CPU determines that the barycentric position is not in the center area 112 (NO at S215), the CPU allows the process to proceed to S225, and displays the normal image 150 on the display 40. In this case, the CPU determines the right and left border areas 111 and 113 of the imaging region 110, which are difficult to be directly visibly recognized, to be target areas which are to be displayed in an easy-to-see state. Thus, the CPU corrects the image data such that the image of the center area 112 of the imaging region 110 is displayed in a reduced state, while the images of the right and left border areas 111 and 113 are displayed in a normal state, and generates the display image data for entirely displaying the imaging region 110 (S225). Thus, the images of the right and left border areas 111 and 113 are displayed being enlarged compared to the image of the center area 112. In other words, the CPU displays the right and left border areas 111 and 113, which are difficult for the driver to directly visibly recognize during driving compared to the center area 112, in an easily-visible display format (i.e., in an easy-to-see state). In this way, the CPU of the control unit 11 serves as the display control section 11b by performing the steps of S220 and S225.

The determination process at S215 may be performed based on the following determination conditions. Specifically, the conditions include an entry condition which is defined to be a state where the object 120 is absent from the center area 112 of the imaging region 110, followed by new entry of the object 120 into the center area 112 of the imaging region 11. On the other hand, the conditions include a retreat condition which is defined to be a state where the object 120 is present in the center area 112, followed by movement of the object 120 out of the center area 112. Either of the entry and retreat conditions may be a condition more difficult to be met than the other condition.

Specifically, the entry condition of the object 120 may be defined, for example, to be a situation in which at least a part of the object region of the object 120 that has been present outside the center area 112 has come to be positioned in the center area 112. The retreat condition of the object 120 may be defined, for example, to be a situation in which the entire object region of the object 120 that has been present in the center area 112 has come to be positioned outside the center area 112, or a situation in which the barycentric position of the object 120 has come to be positioned outside the center area 112.

Alternatively, the entry condition of the object 120 may be defined, for example, to be a situation in which the entire object region of the object 120 that has been present outside the center area 112 has come to be positioned in the center area 112, or a situation in which the barycentric position of the object 120 has come to be positioned in the center area 112. The retreat condition of the object 120 may be defined to be a situation in which at least a part of the object region of the object 120 that has been present in the center area 112 has come to be positioned outside the center area 112.

If the determination process at S215 is performed based on such determination conditions, the steps of S220 and S225 are performed as follows. If the CPU of the control unit 11 determines that the object 120 is not present in the center area 112, and the entry condition is met, the CPU performs the step of S220. On the other hand, if the entry condition is not met, the CPU performs the step of S225. If the CPU of the control unit 11 determines that the object 120 is present in the center area 112, and the retreat condition is not met, the CPU performs the step of S220. On the other hand, if the retreat condition is met, the CPU performs the step of S225.

Thus, the ECU (image generating device) 10 of the present embodiment can prevent frequent switching between the normal image 150 and the warning image 160 displayed on the display 40 (i.e., types of displayed image) when the object 120 is present near a border of the center area 112.

In the display step of S220, the CPU of the control unit 11 generates image data on the basis of a video signal derived from the camera 20, corrects the generated image data, and generates display image data for the warning image 160 (image displaying the center area 112 in a normal state, and the right and left border areas 111 and 113 in a reduced state). Resultantly, the CPU of the control unit 11 outputs a video signal for displaying the display image data to the display 40, causes the display 40 to display the warning image 160, and terminates the present process.

If the object 120 is also present in either of the right and left border areas 111 and 113 besides the center area 112, the CPU of the control unit 11 may perform the following display process. The CPU generates display image data for the warning image 160 to provide a normal state display for the center area 112 and the border area where objects 120 are present, and to provide a reduced state display for the border area where the object 120 is not present.

On the other hand, in the display step of S225, the CPU of the control unit 11 generates image data on the basis of a video signal derived from the camera 20, corrects the generated image data, and generates display image data for the normal image 150 (image displaying the center area 112 in a reduced state, and the right and left border areas 111 and 113 in a normal state). Resultantly, the CPU of the control unit 11 outputs a video signal for displaying the display image data to the display 40, causes the display 40 to display the normal image 150, and terminates the present process.

[Advantageous Effects]

The imaging system 1 provided with the image generating device of the present embodiment displays, on the display 40, an image that is an overview around the own vehicle 100. In doing so, if the object 120 is present in the center area 112, the imaging system 1 displays the warning image 160 in which the center area 112 is displayed in a normal state, and the right and left border areas 111 and 113 are displayed in a reduced state. If the object 120 is present in either of the right and left border areas 111 and 113, the imaging system 1 displays the normal image 150 in which the center area 112 is displayed in a reduced state, and the right and left border areas 111 and 113 are displayed in a normal state. In other words, in the imaging system 1 provided with the image generating device of the present embodiment, the imaging area where the object 120 is present is shown in an easy-to-see state (high-visibility state) in the displayed image. Accordingly, the driver can easily recognize the object 120 present in the imaging region 110 (i.e., object present around the own vehicle 100).

In the imaging region 110 of the present embodiment, the right border area 111, the center area 112, and the left border area 113 are each formed into a sector shape and arranged in a row in the horizontal direction D (right-and-left direction) relative to the forward direction of the camera 20. The imaging system 1 provided with the image generating device of the present embodiment displays the image of the imaging area where the object 120 is present in a normal state. On the other hand, the imaging system 1 displays the image of the imaging area where the object 120 is not present in a reduced state, after being corrected and reduced in the horizontal direction D (right-and-left direction) relative to the forward direction of the camera 20. This enables the imaging system 1 provided with the image generating device of the present embodiment to display the image that is an overview around the own vehicle 100, and if the object 120 is present in the imaging area, to show the object 120 in a display format easily visually recognizable to the driver (i.e., in an easy-to-see state) in the displayed image.

In the present embodiment, if the object 120 is absent from the areas in the imaging region 110, or if the object 120 is present only in the right border area 111 or the left border area 113, the images of the right and left border areas 111 and 113 are displayed being enlarged compared to the image of the center area 112. This enables the driver during driving to easily visually recognize the right and left border areas 111 and 113 that are difficult to be directly visually recognized.

[Second Embodiment]

An imaging system 1 according to the present embodiment is configured similarly to that of the first embodiment, but differs therefrom in the following points. An ECU (image generating device) 10 of the present embodiment determines a degree of risk indicating a probability of an object 120 coming into contact with the own vehicle 100, on the basis of a predetermined criterion. Based on the determined degree of risk (i.e., determination results), the ECU 10 of the present embodiment selects a target area that is an imaging area to be displayed in an easy-to-see state, from among a plurality of imaging areas. In response to the results, the ECU 10 of the present embodiment selects either of the normal image 150 and the warning image 160 as a display image to be displayed on the display 40. Thus, the present embodiment differs from the first embodiment in that the CPU of the control unit 11 in the ECU 10 serves as the risk determination section 11*c* by performing a predetermined process.

Figure 6:
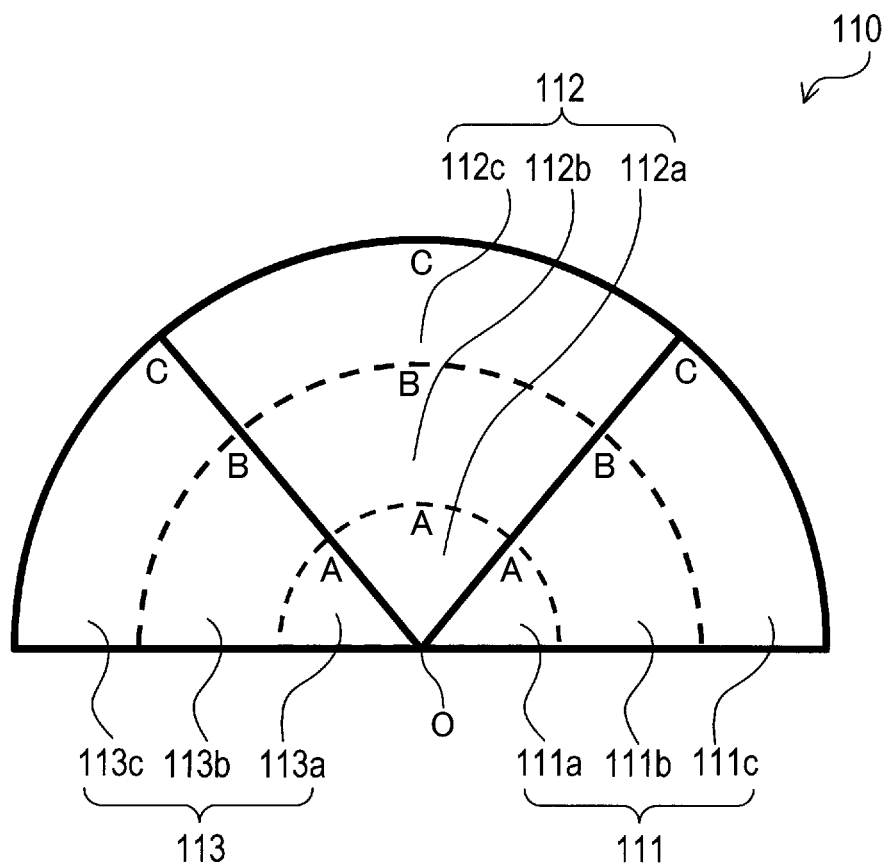
FIG. 6 is a diagram illustrating an imaging region and imaging areas, according to a second embodiment.

Hereinafter will be described a method of determining a degree of risk performed by the ECU 10 of the present embodiment. In an example of the determination method of the present embodiment, a distance between the own vehicle 100 and the object 120 is used as a criterion to determine a degree of risk to the own vehicle 100 posed by the object 120. FIG. 6 is a diagram illustrating an imaging region 110 and imaging areas 111, 112, and 113 of the present embodiment. In FIG. 6, a position relative to the own vehicle 100 can be indicated by a position in the coordinate spaces concentrically spreading from a center O of the imaging region 110.

As shown in FIG. 6, the imaging areas 111, 112, and 113 of the present embodiment are each divided into three zones (zone A, zone B, and zone C), depending on a relative distance from the own vehicle 100 to the object 120. The zones are allocated and correlated to (i.e., defined with) respective degrees of risk, according to predetermined criteria. Accordingly, the degree of risk to the own vehicle 100 posed by the object 120 present in each of the imaging areas 111, 112 and 113 is determined on the basis of the zone where the object 120 is located.

A specific example of defining degrees of risk in the zones is set forth below. In the present embodiment, the degree of risk indicating a probability of the object 120 coming into contact with the own vehicle 100 during travelling is defined with four grades on the basis of the relative distance between the own vehicle 100 and the object 120. For example, in the right and left border areas 111 and 113, a degree of risk [3] is defined for 111*a* and 113*a* of the zone A closest to the own vehicle 100. A degree of risk [2] is defined for 111*b* and 113*b* of the zone B secondly closest to the own vehicle 100, and a degree of risk [1] is defined for 111*c* and 113*c* of the zone C farthest from the own vehicle 100. In the center area 112, a degree of risk [4] is defined for 112*a* of the zone A closest to the own vehicle 100. A degree of risk [3] is defined for 112*b* of the zone B secondly closest to the own vehicle 100, and a degree of risk [2] is defined for 112*c* of the zone C farthest from the own vehicle 100. In this way, it is ensured in the present embodiment that a position closer to the own vehicle 100 is set to a value indicating a higher degree of risk, while a position farther from the own vehicle 100 is set to a value indicating a lower degree of risk. Thus, in the present embodiment, the degree of risk defined for the zone where the object 120 is present is determined to be a degree of risk to the own vehicle 100 posed by the object 120.

The method of determining a degree of risk is not limited to the above method. For example, as another determination method, a degree of risk may be determined using a criterion, such as the moving direction or the moving speed of the object 120 identified based on the detection signal from the detection sensor 30, the type of the object 120 (i.e., pedestrian, vehicle, or guardrail), or the like. Specifically, in the determination method that uses a moving direction as a criterion, the object 120 moving toward the own vehicle 100 may be determined to have a higher degree of risk than the object 120 moving in a direction departing from the own vehicle 100. In the determination method that uses a moving speed as a criterion, the object 120 moving at a speed of not less than a predetermined value may be determined to have a higher degree of risk than the object 120 moving otherwise. In the determination method that uses the type of the object 120 as a criterion, the object 120 that is a pedestrian, a bicycle, or a motorcycle may be determined to have a higher degree of risk than the object 120 that is a four-wheel vehicle, such as a standard-sized automobile or a large-sized automobile.

Furthermore, in addition to the method of determining a degree of risk on the basis of one criterion as described above, another possible determination method may use a plurality of criteria to determine a degree of risk. In this case, a degree of risk for one object 120 may be determined first based on each of the criteria, and then a sum of the determined degrees of risk based on the criteria may be determined to be an ultimate degree of risk of the object 120.

At S210 of the image displaying process of the present embodiment, the CPU of the control unit 11 provided to the ECU 10 determines a degree of risk to the own vehicle 100 posed by the detected object 120, in addition to performing the process shown in the first embodiment (the process of calculating the barycentric position of the object 120). At the subsequent S215, the CPU selects a target area to be displayed in an easy-to-see state, from among the plurality of imaging areas, on the basis of the imaging area where the object 120 is present and the degree of risk posed by the object 120. Then, based on the results, the CPU selects the type of the display image (the normal image 150 or the warning image 160).

In this case, if the object 120 is present only in one imaging area among the center area 112 and the right and left border areas 111 and 113, the CPU selects the type of the display image similarly to the first embodiment.

On the other hand, if objects 120 are present in a plurality of imaging areas, the CPU calculates a sum of the degrees of risk of all the detected objects 120 for each of the imaging areas where the objects 120 are present. Thus, if the sum of the degrees of risk calculated for the center area 112 is equal to or greater than a predetermined value, for example, the process proceeds to S220 where the warning image 160 is displayed. On the other hand, if the sum of the degrees of risk is less than the predetermined value, the process may proceed to S225 to display the normal image 150. If the sum of the degrees of risk calculated for the center area 112 is larger than the sum of the degrees of risk calculated for the right and left border areas 111 and 113, for example, the process proceeds to S220 (the process of displaying the warning image 160). On the other hand, if the former is equal to or less than the latter, the process may proceed to S225 (the process of displaying the normal image 150).

[Advantageous Effects]

In the imaging system 1 provided with the image generating device of the present embodiment, the following advantageous effects can be obtained, in addition to those obtained in the first embodiment. Specifically, if a plurality of objects 120 are present in the imaging region 110, the type of display image is switched based on not only the results of determination as to which of the imaging areas of the imaging region 110 the detected objects 120 are present, but also the results of determination on the degree of risk to the own vehicle 100 posed by the objects 120. This enables the imaging system 1 provided with the image generating device of the present embodiment to display, in an enlarged manner, the imaging area where the object 120 with a high probability of contacting the own vehicle 100 (degree of risk) is present, thereby drawing the driver's attention.

[Other Embodiments]

The image generating device of the present disclosure has so far been described. However, the present disclosure is not limited to the embodiments described above but can be implemented in various modes.

(1) In the first and second embodiments, the imaging region 110 is provided in the forward direction of the own vehicle 100, but is not limited thereto. In an embodiment, for example, the imaging region 110 may be provided in the rearward direction or the lateral direction of the own vehicle 100.

In the first and second embodiments, the imaging region 110 is designed to have a sector shape, but is not limited thereto. In an embodiment, the imaging region 110 may be designed, for example, to have a shape elongated in the horizontal direction D relative to the forward direction of the camera 20. Moreover, the imaging region 110 may be made up of two, or four or more imaging areas arranged in a row in the horizontal direction D relative to the forward direction of the camera 20. In this case, the imaging area that can be directly and easily seen by the driver (area of high visibility) during driving is treated similarly to the center area 112 of the first and second embodiments. Further, the imaging area difficult to be directly seen (area of low visibility) may be treated similarly to the right and left border areas 111 and 113 to perform the image displaying process.

If the imaging region 110 is provided in the rearward direction of the own vehicle 100, the imaging area immediately behind the own vehicle 100 is taken to be the center area 112. Further, the imaging areas on the right and left sides of the center area 112 may be taken to be the right and left border areas 111 and 113, respectively, to perform the image displaying process. In this case, the center image region 162 of the warning image 160 may be made larger than in the case where the imaging region 110 is provided in the forward direction of the own vehicle 100, so that the center area 112 is displayed in a more enlarged manner. The embodiment of such a configuration can achieve advantageous effects similar to those of the first and second embodiments.

(2) In an embodiment, the functions of one component of the first and second embodiments may be distributed to a plurality of components, or the functions of a plurality of components may be integrated into one component. In an embodiment, at least a part of the configuration of the first and second embodiments may be replaced by a known configuration having a similar function. In an embodiment, a part of the configuration of the first and second embodiments may be omitted. In an embodiment, at least a part of the configuration of the first or second embodiment may be added to, or replaced by, the configuration of another embodiment. The technique of the present disclosure should encompass any mode based on the technical idea which is specified by only the wordings used in the embodiments.

(3) Besides the modes described in the above embodiments, the imaging system 1 of the present disclosure may also be realized in various modes, such as the components of the imaging system 1, a program for allowing a computer to function as the imaging system 1, a medium recording the program, and a method for realizing the image displaying process.

[Correspondence to Claims]

Correspondency between the terms used in the description of the above embodiments and the terms used in the description of the claims are set forth below. The ECU 10 provided to the imaging system 1 of the foregoing embodiments corresponds to the image generating device. S200 to S215 of the image displaying process serving as the obstacle detection section 11*a* of the control unit 11 correspond to the determination means. S220 and S225 of the image displaying process serving as the display control section 11*b* of the control unit 11 correspond to the acquisition means, the selection means, the generation means, and the display means.

The center area 112 of the imaging region 110 corresponds to the easy-to-see area, and the right and left border areas 111 and 113 of the imaging region 110 correspond to the difficult-to-see area.

REFERENCE SIGNS LIST

1: Imaging system, 10: ECU, 11: Control unit, 11*a*: Obstacle detection section, 11*b*: Display control section, 20: Camera, 30: Detection sensor, 40: Display, 100: Own vehicle, 110: Imaging region, 111: Right border area, 112: Center area, 113: Left border area.

The invention claimed is:

1. An image generating device comprising:
   an acquisition means for capturing an image of an imaging region around an own vehicle with a camera through a wide-angle lens, and acquiring image data, the imaging region being configured by a plurality of imaging areas;
   a determination means for detecting an object present around the own vehicle and determining whether the object is present in the imaging areas, on the basis of detection results;
   a selection means for selecting a target area to be displayed in an easy-to-see state from among the plurality of imaging areas, on the basis of determination results derived from the determination means;
   a generation means for adjusting a reduction degree of an image of at least one imaging area in the plurality of imaging areas such that the image of the target area is displayed in an easy-to-see state compared to the image of at least one remaining imaging area, and correcting the image data to generate display image data for displaying an entire imaging region; and
   a display means for displaying the display image data, wherein
   when the determination means determines that the object is not present in any of the imaging areas,
   the selection means selects an imaging area from among the plurality of imaging areas and sets the selected imaging area as the target area, the imaging area comprising a difficult-to-see area, which is an area around the own vehicle that is not directly visible to a driver of the own vehicle, and
   the image of the target area is displayed as enlarged compared to the image of the at least one remaining imaging area in the plurality of imaging areas.

2. The image generating device according to claim 1, wherein
   the imaging region horizontally extends around the own vehicle,
   the imaging areas are arranged in a row in a horizontal direction intersecting a forward direction of the camera, and
   the generation means adjusts a horizontal reduction degree of the image of each imaging area in correcting the image data.

3. The image generating device according to claim 1, wherein
   the determination means determines a degree of risk indicating a probability of the object coming into contact with the own vehicle, and
   the selection means selects the target area on the basis of the degree of risk.

4. The image generating device according to claim 1, wherein
   an imaging area that is easy for the driver to directly see during driving is determined to be an easy-to-see area, from among the plurality of imaging areas,
   the determination means determines an entry condition that is a condition in which the object has newly entered the easy-to-see area, and determines a retreat condition that is a condition in which the object present in the easy-to-see area has moved out of the area, and
   either one of the entry condition and the retreat condition is more difficult to be met than the other condition.

5. An image generating method in an image generating device, comprising:
   an acquisition step of capturing an image of an imaging region around an own vehicle with a camera through a wide-angle lens, and acquiring image data, the imaging region being configured by a plurality of imaging areas;
   a determination step of detecting an object present around the own vehicle and determining whether the object is present in the imaging areas, on the basis of detection results;
   a selection step of selecting a target area to be displayed in an easy-to-see state from among the plurality of imaging areas, on the basis of determination results derived from the determination step;
   a generation step of adjusting a reduction degree of an image of at least one imaging area in the plurality of imaging areas such that the image of the target area is displayed in an easy-to-see state compared to the image of at least one remaining imaging area, and correcting the image data to generate display image data for displaying an entire imaging region; and
   a display step of displaying the display image data, wherein
   when the determination means determines that the object is not present in any of the imaging areas,
   the selection means selects an imaging area from among the plurality of imaging areas and sets the selected imaging area as the target area, the imaging area comprising a difficult-to-see area, which is an area around the own vehicle that is not directly visible to a driver of the own vehicle, and
   the image of the target area is displayed as enlarged compared to the image of the at least one remaining imaging area in the plurality of imaging areas.

6. An image generating device comprising:
a memory;
a processor communicable to the memory; and
a set of computer-executable instructions stored on the memory that cause the processor to implement:
- capturing an image of an imaging region around an own vehicle-with a camera through a wide-angle lens, and acquiring image data, the imaging region being configured by a plurality of imaging areas;
- detecting an object present around the own vehicle and determining whether the object is present in the imaging areas, on the basis of detection results;
- selecting a target area to be displayed in an easy-to-see state from among the plurality of imaging areas, on the basis of determination results;
- adjusting a reduction degree of an image of at least one imaging area in the plurality of imaging areas such that the image of the target area is displayed in an easy-to-see state compared to the image of at least one remaining imaging area, and correcting the image data to generate display image data for displaying the entire imaging region; and
- displaying the display image data, wherein when determined that the object is not present in any of the imaging areas,
the processor selects an imaging area from among the plurality of imaging areas and sets the selected imaging area as the target area, the imaging area comprising a difficult-to-see area, which is an area around the own vehicle that is not directly visible to a driver of the own vehicle, and
the image of the target area is displayed as enlarged compared to the image of the at least one remaining imaging area in the plurality of imaging areas.

7. The image generating device according to claim 1, wherein
when the determination means determines that the object is present in at least one of the imaging areas,
the selection means selects the imaging area from among the plurality of imaging areas and sets the selected imaging area as the target area, the imaging area comprising an object-present area, which is an area around the own vehicle within which the object is present, and
the image of the target area is displayed as enlarged compared to the image of the at least one remaining imaging area in the plurality of imaging areas.

8. The image generating device according to claim 1, wherein
the determination means determines whether the object is present ahead of the own vehicle.

* * * * *